No. 841,196. PATENTED JAN. 15, 1907.
T. THORP.
ANTIPULSATOR FOR GAS CONDUITS.
APPLICATION FILED JAN. 17, 1906.

2 SHEETS—SHEET 1.

WITNESSES
W. P. Burke
John A. Percival

INVENTOR
Thomas Thorp
By Richardson
ATTYS

No. 841,196. PATENTED JAN. 15, 1907.
T. THORP.
ANTIPULSATOR FOR GAS CONDUITS.
APPLICATION FILED JAN. 17, 1906.
2 SHEETS—SHEET 2.
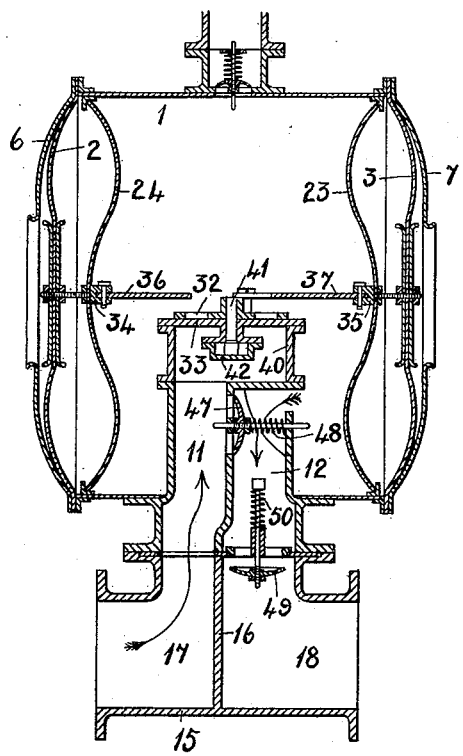
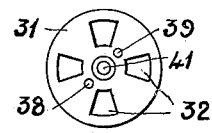
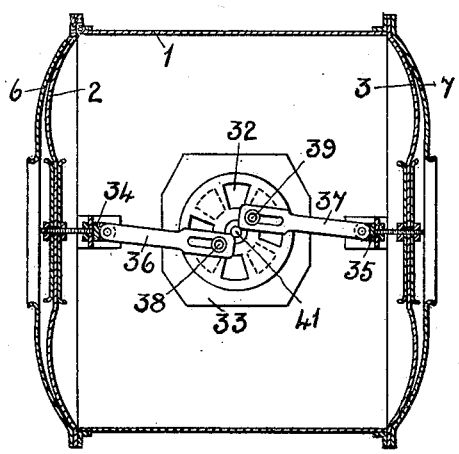
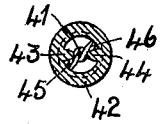
WITNESSES
W. P. Burke
John G. Percival
INVENTOR
Thomas Thorp
By
Richards
ATTYS

UNITED STATES PATENT OFFICE.

THOMAS THORP, OF WHITEFIELD, ENGLAND.

ANTIPULSATOR FOR GAS-CONDUITS.

No. 841,196.  Specification of Letters Patent.  Patented Jan. 15, 1907.

Application filed January 17, 1906. Serial No. 296,558.

*To all whom it may concern:*

Be it known that I, THOMAS THORP, a subject of the King of Great Britain and Ireland, and a resident of Whitefield, in the county of Lancaster, England, have invented certain new and useful Improvements in Antipulsators for Gas-Conduits, of which the following is a specification.

This invention relates to antipulsators used for regulating the flow and pressure of gas in pipes; and it consists in improvements therein the object of which is to allow the extension and contraction of the antipulsator-chamber within certain limits without alteration of the valve-openings and to render the opening or closing of the valve when the contraction or extension exceeds said limits slow and gradual.

The improved antipulsators are more particularly intended for use with inferential rotary station gas-meters, such as described in my patent dated June 30, 1903, No. 732,385, placed in the gas-pipe leading from the gas-supply to the exhauster, in which the pulsations in the pipe prevent the correct registration of the gas passing through the meters, but may be applied for other purposes—as, for instance, the regulation of the flow and pressure in gas-pipes supplying gas-engines.

The improvements consist in the arrangement of the connection between the diaphragm or diaphragms and the valve of the antipulsator in such a manner that the diaphragm or diaphragms can move inward and outward within certain limits without moving the valve, in combination with a dash-pot attached to the valve, which retards its motion in either direction when these limits are exceeded, and thus prevents sudden changes of pressure in the gas-pipe, which would prevent the correct registration of the meter by causing pulsations through it.

Figure 1:
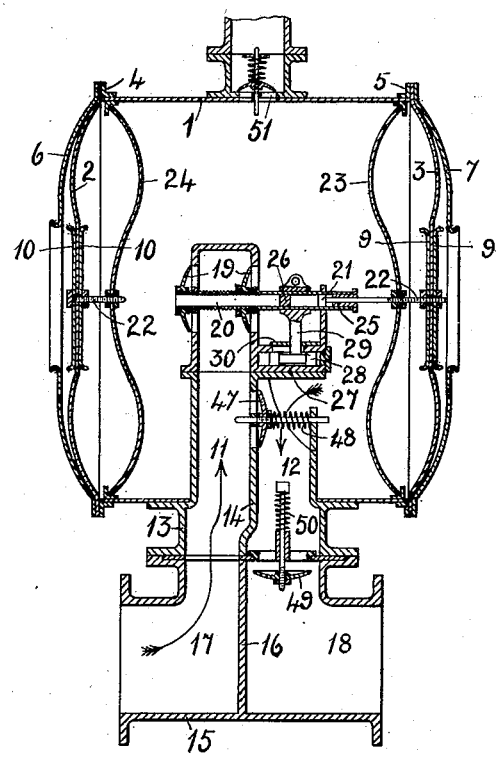
Figure 2:
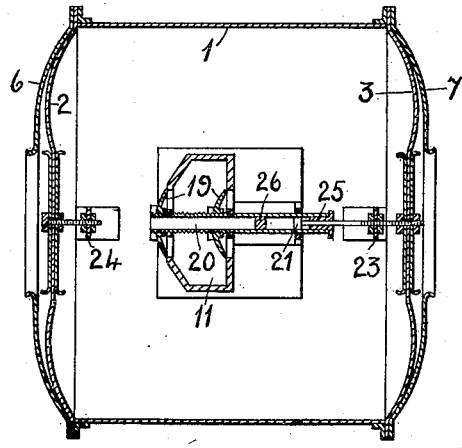

On the drawings appended hereunto two modified forms of construction of the improved antipulsator are represented as examples, showing how my invention may be carried out, Figure 1 representing a vertical section, and Fig. 2 a horizontal section, of one form of apparatus; and Figs. 3 and 4, similar section of another form, Figs. 5 and 6 showing details thereof.

The antipulsator consists of a preferably cylindrical casing 1, over the ends of which flexible diaphragms 2 3 are fixed by being clamped between the angle-iron rings 4 and 5 of the casing and the covers 6 and 7, bolted thereto. The diaphragms are stiffened in the center by plates 9 and 10 and connected to springs so arranged that they draw the diaphragms toward each other. Preferably flat spring-blades 23 and 24, bent into corrugated curvature between the neutral curvature and that of maximum pressure, are employed, the pull of which on the diaphragms connected to them decreases as the diaphragms move outward, and thus counteracts the increase in the resistance of the diaphragm to its outward motion.

Instead of two diaphragms only one may be used and the other end of the casing closed by a metal cover; but two diaphragms are preferred, as they allow of a greater variation or volume in the casing and permit its size to be reduced for a certain variation required.

To the bottom of the casing 1 an inlet-pipe 11 and an outlet-pipe 12 are fixed and enter the same. Preferably these two pipes are formed in a single casting 13, divided by a partition-plate 14. To the under side of the pipes the connections to the gas-mains are fixed, which in the arrangement shown consist of a casting 15, divided by a partition-plate 16, so as to form separate inlet and outlet branches 17 and 18, the gas entering the casing through the pipes 17 and 11 and flowing out through the pipes 12 and 18.

The top of the inlet-pipe is provided with a valve connected to one of the diaphragms or to both of them in such a manner that the diaphragms can move inward and outward within certain limits without moving the valve, and a dash-pot is attached to the valve, which retards its motion when these limits are exceeded.

In the apparatus represented by Figs. 1 and 2 the valve employed is a double-seated equilibrium-valve 19, the spindle 20 of which is suitably guided and tubular. A piston 21, formed on the bolt 22, connecting the spring 23 to the diaphragm 3, can slide inside the tubular valve-spindle 20 between stops 25 and 26, fixed in the tube, so that the diaphragm can move in and out for the distance the piston can travel without coming against one of the said stops. The valve is shown closed on the drawings, into which position it will be brought by the outward movement of the diaphragm 3 when the outflow of gas through the outlet-pipe 18 is stopped. When the outflow is resumed, the pressure inside the casing will be reduced and the diaphragms will be moved inward by the springs, the piston 21 will encounter the stop 26, and the valve will be opened. To prevent the sudden opening of the valve to the full extent, which by causing an excessive pulsation in the supply-pipe would interfere with the correct registration by a rotary gas-meter inserted into the supply-pipe leading to the inlet 17, the movement of the valve is retarded by means of a dash-pot of any suitable construction. As represented it consists of a cylinder 27, in which a piston 28 fits, which is connected to the tubular valve-spindle 20 by means of an arm 29, entering into the piston and clamped to the spindle 20 or by equivalent means. The oil filling the cylinder passes from one end to the other through a fine bore through the piston or a small groove or clearance on its under side. The slot in the upper side of the cylinder, in which the arm 29 moves, is closed by a sliding cover 30. By this arrangement the ordinary variations of the flow into or from the casing 1 are compensated for by the free expansion and contraction of its capacity by means of the diaphragms, and the valve comes only into action when the variations of flow or pressure become greater and then acts gradually, the dash-pot preventing the sudden opening or closing of the valve, which by suddenly stopping or starting the inlet-current would prevent the correct registration of the flow by means of a rotary or other meter affected by pulsations.

In the arrangement shown by Figs. 3 to 6 the valve is a rotary slide-valve 31 with ports 32, and the top of the inlet-pipe 11 is enlarged into a chamber 40, the top 33 of which is formed with corresponding ports. (Indicated in dotted lines on Fig. 4.) The bolts attaching the diaphragms 2 and 3 to the springs 24 and 23, respectively, are formed with slotted heads 34 and 35, to which links 36 and 37 are connected by pins. The other ends of the links are formed with elongated slots, into which the pins 38 39, fixed in the slide-valve 31, engage, the slots allowing the diaphragms to move inward or outward for a certain distance without moving the valve. When moved farther inward from the closing position shown on the drawings, the links will turn the valve which is fixed to the spindle 41 and open the ports. To retard the movement, the dash-pot 42 is arranged, consisting of a short cylinder in which two partitions 43 and 44, Fig. 6, are fixed, extending to the spindle 41, which is formed with two wings 45 and 46. As the valve and spindle are turned the oil in the dash-pot has to pass from one side of the wings to the other side past the wings or through small perforations or grooves in the same, and thereby retards the motion of the valve.

Any other suitable kind of valve connected to the diaphragm by a connection which allows the diaphragm to move in or out within certain limits without moving the valve and any other suitable kind of dash-pot may be used.

When the antipulsator is connected to a gas-engine, the valve will become closed when the engine is stopped, and when the latter is restarted again and draws gas from the chamber 1 the valve will, on account of the dash-pot, not open immediately, and the gas-supply to the engine would be insufficient if the engine is large in proportion to the size of the antipulsator. To meet this difficulty, a by-pass valve 47 is arranged on the inlet-pipe 11 and held to its seating by a spring 48. When the pressure in the casing 1 falls below the normal working pressure, this valve opens and allows gas to pass into the outlet-pipe 12 without its passing through the inlet-valve at the top of the inlet-pipe while the engine makes its first or second stroke, and during these the diaphragms will open the inlet-valve sufficiently to supply it and the valve 47 closes again.

A back-pressure valve 49, supported on a light spring 50, is arranged in the outlet-pipe 18 when the antipulsator is used in connection with a gas-engine to protect the antipulsator against an excessive pressure that may be caused by back-firing. A safety-valve 51 is mounted on the top of the casing 1 to allow gas to escape when the pressure of the gas flowing into the casing becomes from any cause greater than that for which the antipulsator is intended.

I claim as my invention—

1. In an antipulsator for gaseous fluids the combination with the casing thereof of a diaphragm fixed over one end of said casing, a spring adapted to pull the diaphragm inward, an inlet-pipe provided with a valve, an outlet-pipe from the casing, a connection between said inlet-valve and said diaphragm adapted to allow the diaphragm to move inward and outward within limits without moving the valve and to open and to close it when said limits are exceeded.

2. The combination with an antipulsator for gaseous fluids having a diaphragm closing one side thereof and a spring adapted to pull the diaphragm inward of an inlet-pipe provided with a valve, an outlet-pipe, a connection between said inlet-valve and said diaphragm adapted to allow the diaphragm to move inward and outward within limits without moving the valve and to open and to close it when the movement of the diaphragm exceeds said limits, and a dash-pot connected to said valve and adapted to retard its movements in either direction.

3. In an antipulsator for gaseous fluids the combination of a casing, diaphragms fixed over the ends thereof and springs adapted to pull the diaphragms inward with an increasing pressure for the purpose of obtaining an equal pressure throughout the range, an inlet-pipe and an outlet-pipe to and from said casing, a valve on said inlet-pipe adapted to close and open the gas-inlet, a connection between one of said diaphragms and said inlet-valve adapted to allow the diaphragm to move inward and outward within certain limits without moving the valve and to open and close the same when said limits are exceeded, and a dash-pot connected to said valve and adapted to retard its movement.

4. In an antipulsator for gaseous fluids the combination of a cylindrical casing, diaphragms fixed over the ends thereof and springs adapted to pull said diaphragms inward, an inlet-pipe and an outlet-pipe to and from said casing, a valve on said inlet-pipe adapted to close and open the gas-inlet, a connection between one of said diaphragms and said inlet-valve adapted to allow the diaphragm to move inward and outward within limits without moving the valve and to open and close the same when said limits are exceeded, a dash-pot connected to said valve and adapted to retard its movement, a second free-lifting valve on said inlet-pipe and a spring adapted to hold it in its seating.

5. In an antipulsator for gaseous fluids the combination of a cylindrical casing, diaphragms fixed over the ends thereof and springs adapted to pull said diaphragms inward, an inlet-pipe and an outlet-pipe to and from said casing, a valve on said inlet-pipe adapted to close and open the gas-inlet, a connection between one of said diaphragms and said inlet-valve adapted to allow the diaphragm to move inward and outward within limits without moving the valve and to open and close the same when said limits are exceeded, a dash-pot connected to said valve and adapted to retard its movement, a second free-lifting valve on the inlet-pipe and a spring adapted to hold it on its seating, a back-pressure valve in the outlet-pipe and a safety-valve on the casing.

6. In an antipulsator for gaseous fluids the combination of a cylindrical casing, diaphragms fixed over the ends thereof and springs adapted to pull said diaphragms inward, a pipe fixed to the bottom of said casing divided by a partition-plate into an inlet and an outlet pipe and provided with branches for connection to the gas-main, an inlet-valve adapted to close and open the gas-inlet into the casing, a connection between said inlet-valve and one of said diaphragms adapted to allow the diaphragm to move inward and outward without moving the valve and to open and close the valve when said limits are exceeded, a dash-pot connected to said valve and adapted to retard its movement and a second free-lifting valve on said inlet-pipe and a spring adapted to hold it to its seating.

7. In an antipulsator for gaseous fluids the combination of a cylindrical casing, diaphragms fixed over the ends thereof and springs adapted to pull said diaphragms inward, an inlet-pipe and an outlet-pipe to and from said casing, a double-seated equilibrium-valve on said inlet-pipe adapted to close and open the gas-inlet and having a tubular spindle located centrally to said diaphragms, a piston in said tubular spindle and a piston-rod attached to one of said diaphragms, a stop fixed in said tubular spindle on each side of the piston, said stops being farther apart than the thickness of the piston, and a dash-pot connected to said tubular spindle adapted to retard its movement.

8. In an antipulsator for gaseous fluids the combination of a cylindrical casing, diaphragms fixed over the ends thereof and springs adapted to pull said diaphragms inward with an increasing pressure for the purpose of maintaining an equal pressure in the antipulsator throughout the range, a pipe fixed to the bottom of said casing having branches for connection to the gas-main and extending into said casing, a partition-plate in said pipe dividing the same into an inlet and outlet pipe, a top part to the inlet-pipe closed by a double-seated equilibrium-valve, a tubular spindle for said valve located in the center line of said casing and diaphragms, a piston in said tubular spindle and a piston-rod connecting the same to one of said diaphragms, stops fixed in said tubular spindle one on each side of the piston and farther apart than the thickness of the piston, a dash-pot connected to said tubular spindle and adapted to retard its movement a second free-lifting valve on the side of said inlet-pipe and a spring adapted to hold it upon its seating.

9. In an antipulsator for gaseous fluids, the combination of a cylindrical casing, diaphragms fixed over the ends thereof and springs adapted to pull said diaphragms inward with increasing pressure, a pipe fixed to the bottom of said casing divided by a partition-plate into an inlet and an outlet pipe, branches on said inlet and outlet pipes for connection to the gas-main, a top part to the inlet-pipe and a double-seated equilibrium-valve therein adapted to open and close the gas-inlet to the casing, a tubular spindle for said valve located in the center line of the casing and diaphragms, a piston in said tubular spindle and a piston-rod connecting the same to one of said diaphragms, stops fixed in said tubular spindle one on each side of the piston so far apart that the piston can move in and out for a certain distance without striking the same, a dash-pot consisting of a small cylinder parallel to said tubular spindle filled with oil and a piston therein adapted to allow the oil to pass slowly from one side to the other, an arm fixed on the tubular spindle and engaging with the piston through a slot in the top of the cylinder, a second valve on the inlet-pipe adapted to lift freely and a spring adapted to hold it upon its seating, a back-pressure valve in the outlet-pipe and a safety-valve on the said casing.

In testimony whereof I have hereunto set my signature in the presence of two witnesses.

THOMAS THORP.

Witnesses:
   CARL BOLLÉ,
   RIDLEY G. URQUHART.